US012403659B2

United States Patent
Debora et al.

(10) Patent No.: US 12,403,659 B2
(45) Date of Patent: Sep. 2, 2025

(54) AUXILIARY MATERIAL HANDLING UNIT (AMHU)

(71) Applicant: Mosaic Manufacturing Ltd., Toronto (CA)

(72) Inventors: Mitchell Oliver Debora, Thornhill (CA); Derek Alan Vogt, Calgary (CA)

(73) Assignee: Mosaic Manufacturing Ltd., Toronto (CA)

( * ) Notice: Subject to any disclaimer, the term of this patent is extended or adjusted under 35 U.S.C. 154(b) by 0 days.

(21) Appl. No.: 18/350,414

(22) Filed: Jul. 11, 2023

(65) Prior Publication Data

US 2024/0025119 A1 Jan. 25, 2024

Related U.S. Application Data

(62) Division of application No. 16/488,736, filed as application No. PCT/CA2018/050243 on Mar. 2, 2018, now Pat. No. 11,738,513.

(Continued)

(51) Int. Cl.
*B29C 64/118* (2017.01)
*B29C 64/336* (2017.01)
(Continued)

(52) U.S. Cl.
CPC .......... *B29C 64/336* (2017.08); *B29C 64/118* (2017.08); *B29C 64/35* (2017.08);
(Continued)

(58) Field of Classification Search
CPC ..... B29C 64/336; B29C 64/118; B29C 64/35; B29C 64/393; B29C 64/357; B33Y 10/00; B33Y 30/00; B33Y 40/00; B33Y 40/20

See application file for complete search history.

(56) References Cited

U.S. PATENT DOCUMENTS 9,278,536 B2   3/2016   Din et al.
9,468,946 B2   10/2016  Inamasu et al.
(Continued)

FOREIGN PATENT DOCUMENTS

CA   2937643 A1    2/2017
WO   2012085914 A1 6/2012
(Continued)

OTHER PUBLICATIONS

Scott, Clare, Diabase Engineering Introduces the H-Series Desktop Hybrid 3D Printer and CNC Machine [online] Jul. 20, 2018 [retrieved May 12, 2020] Retrieved from the internet: <URL: https://3dprint.com/220069/diabase-engineering-h-series/ (5 pages).

(Continued)

*Primary Examiner* — Galen H Hauth
*Assistant Examiner* — Baileigh Kate Darnell
(74) *Attorney, Agent, or Firm* — Hamilton, Brook, Smith & Reynolds, P.C.

(57) ABSTRACT

Auxiliary material handling units for additive manufacturing (AM), AM methods, methods of handling auxiliary material of an AM system, active print head cleaning devices, feedstock container modules, and related systems are provided. An auxiliary material handling unit (AMHU) includes a material displacer having at least one entry port through which auxiliary material from an AM system is received, wherein the material displacer displaces the auxiliary material away from the at least one entry port. A method of handling auxiliary material of an AM system includes receiving auxiliary material from the AM system in a material displacer having at least one entry port; and, with the material displacer, displacing the auxiliary material away from the at least one entry port. Displaced auxiliary material may be processed with a material processing unit and/or collected in a collection reservoir. At least one sensor may (Continued)

provide feedback to a controller. An active print head cleaning device actively cleans auxiliary material from an AM print head and feeds the auxiliary material into an AMHU. A feedstock container module includes a feedstock container integrated with a collection reservoir for receiving auxiliary material. A method of AM using multiple print heads includes depositing material with a first print head to fabricate a part; and, while depositing material with the first print head, depositing auxiliary material with a second print head away from the part. The deposited auxiliary material may be received and displaced by a material displacer having at least one entry port.

20 Claims, 5 Drawing Sheets

Related U.S. Application Data

(60) Provisional application No. 62/466,536, filed on Mar. 3, 2017.

(51) Int. Cl.
| | | |
|---|---|---|
| *B29C 64/35* | (2017.01) | |
| *B29C 64/357* | (2017.01) | |
| *B29C 64/393* | (2017.01) | |
| *B33Y 10/00* | (2015.01) | |
| *B33Y 30/00* | (2015.01) | |
| *B33Y 40/00* | (2020.01) | |
| *B33Y 40/20* | (2020.01) | |

(52) U.S. Cl.
CPC ............ *B29C 64/393* (2017.08); *B33Y 10/00* (2014.12); *B33Y 30/00* (2014.12); *B33Y 40/00* (2014.12); *B33Y 40/20* (2020.01)

(56) References Cited

U.S. PATENT DOCUMENTS

| | | |
|---|---|---|
| 11,738,513 B2 | 8/2023 | Debora et al. |
| 2001/0045678 A1 | 11/2001 | Kubo et al. |
| 2007/0228590 A1 | 10/2007 | LaBossiere et al. |
| 2008/0317894 A1 | 12/2008 | Turley et al. |
| 2010/0249486 A1 | 9/2010 | Bar |
| 2012/0272617 A1* | 11/2012 | Bar Nathan ............ B29C 64/35 53/111 R |
| 2014/0265049 A1 | 9/2014 | Burris et al. |
| 2015/0158254 A1 | 6/2015 | Chang |
| 2016/0052208 A1 | 2/2016 | Debora et al. |
| 2017/0252820 A1 | 9/2017 | Myerberg et al. |
| 2017/0320268 A1 | 11/2017 | Teken |
| 2018/0201021 A1 | 7/2018 | Beaver |

FOREIGN PATENT DOCUMENTS

| | | |
|---|---|---|
| WO | 2016026045 A1 | 2/2016 |
| WO | 2017009833 A1 | 1/2017 |

OTHER PUBLICATIONS

Maintenance, Cube User Guide/Maintenance [online, retrieved May 12, 2020] Retrieved from the internet: <URL: http://infocenter.3dsystems.com/cube/user-guide/maintenance (35 pages).

International Search Report for International Application No. PCT/CA2018/050243, entitled "Auxiliary Material Handling Unit (AMHU)," mailed on May 16, 2018.

Written Opinion of the International Searching Authority for International Application No. PCT/CA2018/050243, entitled "Auxiliary Material Handling Unit (AMHU)," mailed on May 16, 2018.

* cited by examiner

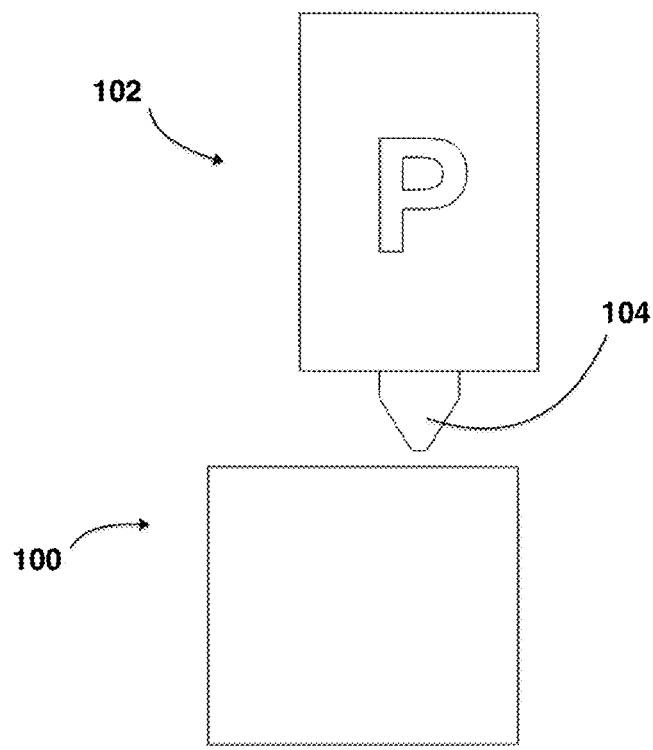
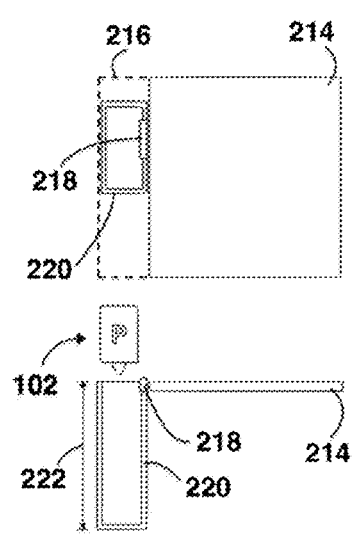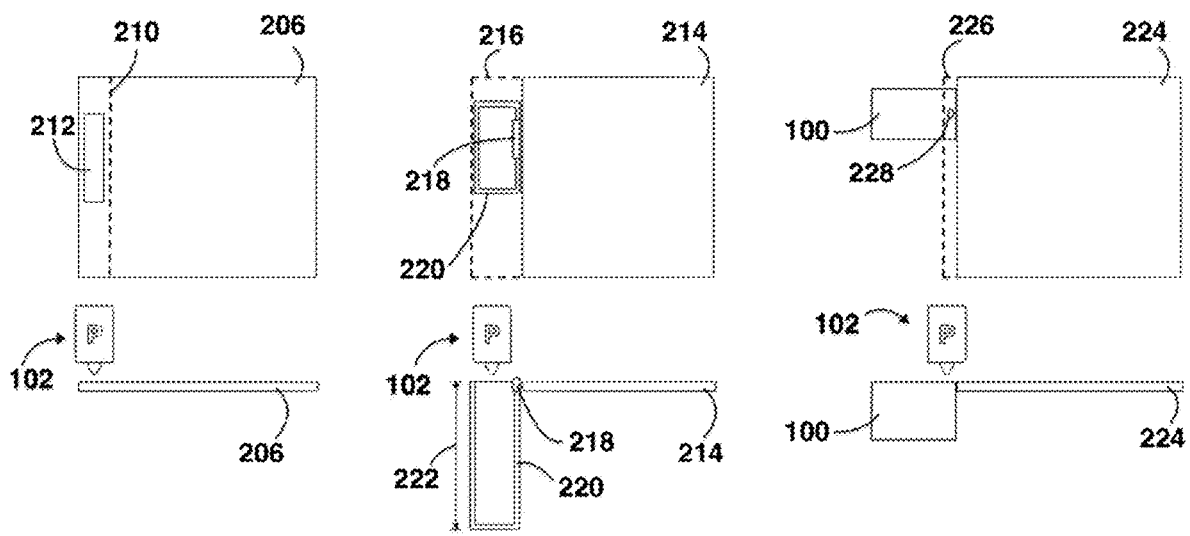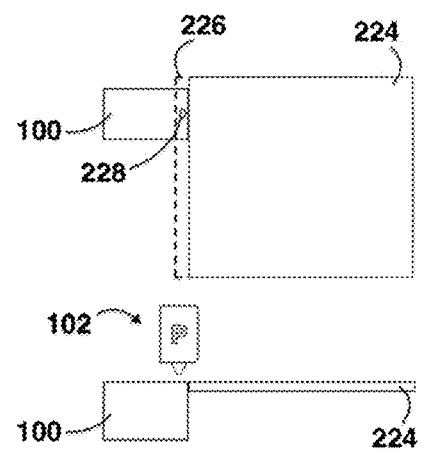
FIG. 2A    FIG. 2B    FIG. 2C

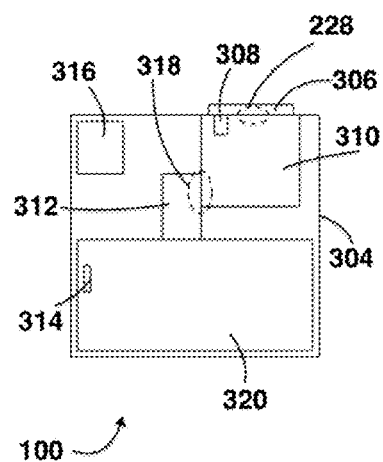
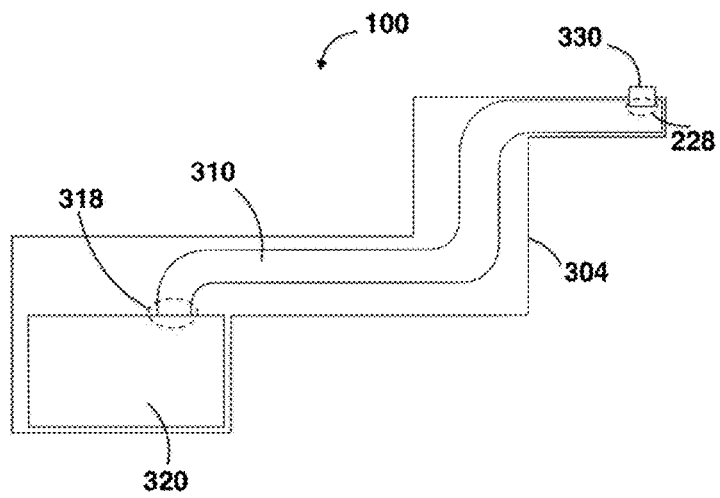
FIG. 3A  FIG. 3B
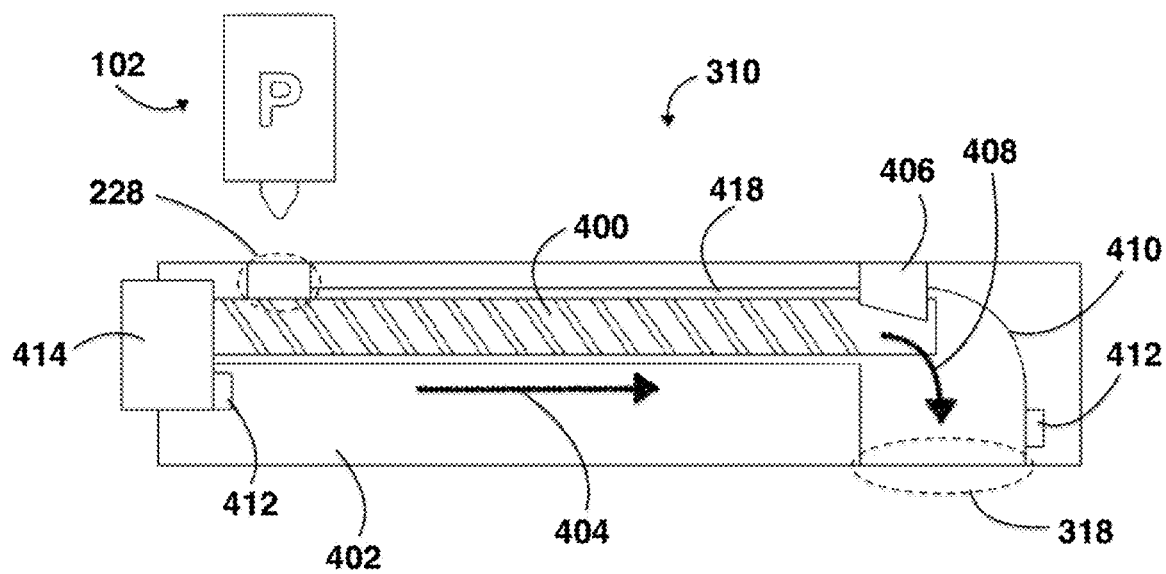
FIG. 4

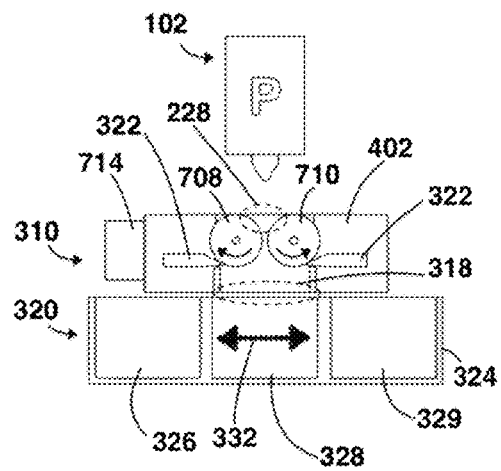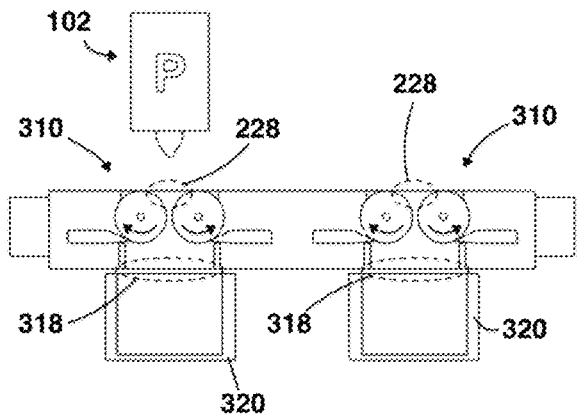
FIG. 7A          FIG. 7B
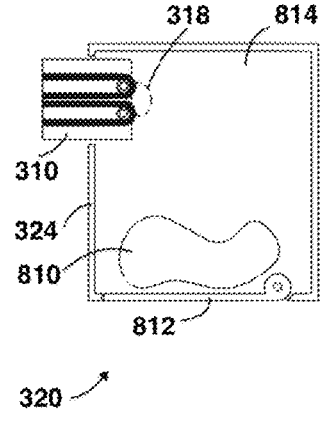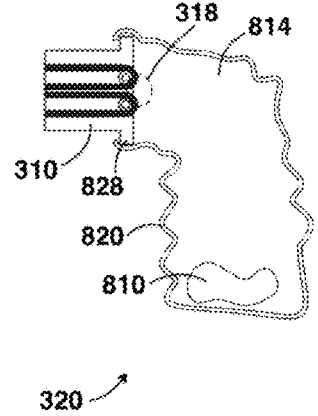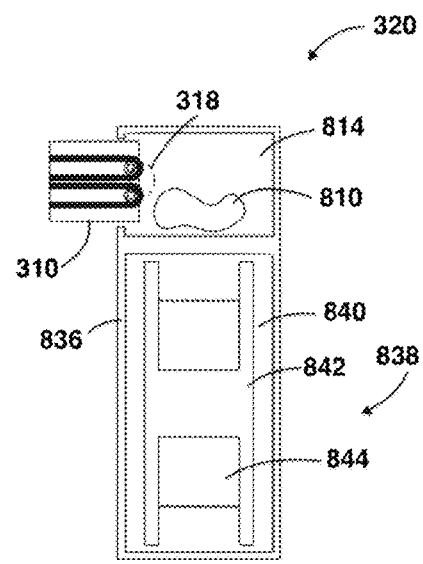
FIG. 8A          FIG. 8B          FIG. 8C

AUXILIARY MATERIAL HANDLING UNIT (AMHU)

RELATED APPLICATION

This is a divisional of U.S. application Ser. No. 16/488,736, filed on Aug. 26, 2019, which is the U.S. National Stage of International Application No. PCT/CA2018/050243, filed Mar. 2, 2018, which designates the U.S., published in English, and claims the benefit of U.S. Provisional Application No. 62/466,536, filed on Mar. 3, 2017. The entire teachings of the above applications are incorporated herein by reference.

FIELD

The field of the invention concerns methods and products for handling auxiliary material in additive manufacturing (AM).

BACKGROUND

Traditional mass manufacturing is characterized by high volume production of standardized products, typically by means of an assembly line. Components of mass-produced products are generally manufactured independently by specialized processes and then assembled into a finished product, which is then distributed. With many recent advances in additive manufacturing (AM), it is becoming more feasible to manufacture complex products in a single build process based on a digital representation of the product. Rather than building each part separately and then assembling them, AM has potential for products to be manufactured in an integrated manner. Such an integrated process is commonly referred to as direct digital manufacturing (DDM) or direct digital fabrication (DDF). DDF has potential to enable the production of personalized product, permit decentralized manufacturing, reduce inventory requirements, and facilitate rapid delivery of product.

Whereas previously AM was largely used for prototyping, its adoption in manufacturing has created a need for AM systems to become more reliable, more fully automated, faster, larger, and to create a wider variety of end use parts/products. In order to achieve these advancements, many technological obstacles will need to be overcome. The disclosure herein relates to solutions to such obstacles, which are discussed in detail below.

SUMMARY

According to a first aspect, the invention provides an auxiliary material handling unit (AMHU) for use with an additive manufacturing (AM) system, the AMHU comprising a material displacer having at least one entry port through which auxiliary material from an AM system is received, wherein the material displacer displaces the auxiliary material away from the at least one entry port.

In some embodiments, the material displacer can comprise a movable element and an actuator, the actuator driving the movable element to displace the auxiliary material. In some embodiments, the material displacer can comprise a conveyor belt mechanism. In some embodiments, the material displacer can comprise an air flow mechanism.

In some embodiments, the material displacer can further comprise an exit port, the auxiliary material being displaced from the at least one entry port to the exit port. In some embodiments, the exit port can comprise two or more exit ports.

In some embodiments, the AMHU can further comprise a collection reservoir, wherein the auxiliary material is displaced into the collection reservoir.

In some embodiments, the AMHU can further comprise a material processing unit that processes auxiliary material received from the AM system.

In some embodiments, the AMHU can further comprise at least one sensor that senses at least one property of the AM system, the AMHU, and/or the auxiliary material. In some embodiments, the at least one sensor can comprise a sensor that senses available capacity of the collection reservoir. In some embodiments, the AMHU can further comprise a controller configured to control operation of the AM system or the AMHU based on feedback from the at least one sensor.

In some embodiments of the first aspect, the AM system can be a fused filament fabrication (FFF) system. In some embodiments of the first aspect, the auxiliary material can comprise polymer-based material.

According to a second aspect, the invention provides a method of handling auxiliary material of an AM system comprising: receiving auxiliary material from the AM system in a material displacer having at least one entry port; and with the material displacer, displacing the auxiliary material away from the at least one entry port.

In some embodiments, the auxiliary material can be displaced from the at least one entry port to an exit port of the material displacer. In some embodiments, the auxiliary material can be displaced to two or more exit ports of the material displacer.

In some embodiments, the auxiliary material can be displaced into a collection reservoir.

In some embodiments, the method can further comprise processing the auxiliary material received from the AM system with a material processing unit.

In some embodiments, the method can further comprise sensing with at least one sensor at least one of a property of the AM system, a property of the AMHU, and a property of the auxiliary material. In some embodiments, the method can further comprise controlling operation of the AM system or the AMHU based on feedback from the at least one sensor.

In some embodiments, the method can further comprise actively removing auxiliary material from an AM print head using an active print head cleaning device and feeding the auxiliary material into the material displacer.

In some embodiments of the second aspect, the AM system can be a fused filament fabrication (FFF) system. In some embodiments of the second aspect, the auxiliary material can comprise polymer-based material.

According to a third aspect, the invention provides an active print head cleaning device, wherein the device actively cleans auxiliary material from an AM print head and feeds the auxiliary material into an AMHU of the first aspect.

According to a fourth aspect, the invention provides a feedstock container module comprising a feedstock container integrated with a collection reservoir for receiving auxiliary material from an AM system. In some embodiments, the collection reservoir can be for receiving the auxiliary material from a material displacer.

According to a fifth aspect, the invention provides an additive manufacturing (AM) system comprising: a first print head; and a first auxiliary material handling unit (AMHU) including a first material displacer having a first entry port to receive auxiliary material from the first print head, the first material displacer configured to displace the auxiliary material away from the first entry port.

In some embodiments, the first AMHU can further include a first material processing unit to process the received auxiliary material.

In some embodiments, the first AMHU can further include a first collection reservoir and the first material displacer can be configured to displace the auxiliary material into the first collection reservoir. In some embodiments, the first collection reservoir can be integrated with a first feedstock container in a first feedstock container module.

In some embodiments, the AM system can further comprise a second print head wherein the AM system is configured to coordinate printing by the first and second print heads so that, while one of the first and second print heads is depositing material to fabricate a part, the other of the first and second print heads is depositing auxiliary material away from the part.

In some embodiments, the AM system can further comprise a second AMHU including a second material displacer having a second entry port to receive auxiliary material from the second print head, the second material displacer configured to displace the material away from the second entry port.

In some embodiments, the second AMHU can further include a second material processing unit to process the received auxiliary material.

In some embodiments, the second AMHU can further include a second collection reservoir and the second material displacer can be configured to displace the auxiliary material into the second collection reservoir. In some embodiments, the second collection reservoir can be integrated with a second feedstock container in a second feedstock container module.

In some embodiments, the AM system can further comprise at least one sensor that senses at least one property of the AM system, the first or second AMHU, and/or the auxiliary material. In some embodiments, the at least one sensor can comprise a sensor that senses available capacity of the first or second collection reservoir. In some embodiments, the AM system can further comprise a controller configured to control operation of the AM system or the AMHU based on feedback from the at least one sensor.

In some embodiments, the AM system can further comprise an active print head cleaning device that actively cleans auxiliary material from the first or second print head and feeds the auxiliary material into the respective first or second AMHU.

In some embodiments of the fifth aspect, the AM system can be a fused filament fabrication (FFF) system. In some embodiments of the fifth aspect, the auxiliary material can comprise polymer-based material.

According to a sixth aspect, the invention provides a method of additive manufacturing using multiple print heads, the method comprising: depositing material with a first print head to fabricate a part; and while depositing material with the first print head, depositing auxiliary material with a second print head away from the part.

In some embodiments, the method can further comprise: receiving the deposited auxiliary material in a material displacer having at least one entry port; and with the material displacer, displacing the auxiliary material away from the at least one entry port.

In some embodiments, the auxiliary material can be displaced from the at least one entry port to an exit port of the material displacer. In some embodiments, the auxiliary material can be displaced to two or more exit ports of the material displacer.

In some embodiments, the auxiliary material can be displaced into a collection reservoir.

In some embodiments, the method further comprises processing the received auxiliary material with a material processing unit.

In some embodiments, the method further comprises sensing with at least one sensor at least one of a property of the first or second print heads, a property of the material displacer, and a property of the auxiliary material. In some embodiments, the sensing can include sensing a property of the second print head. In some embodiments, the method can further comprise controlling operation of the AM system or the AMHU based on feedback from the at least one sensor.

In some embodiments, the method can further comprise actively removing auxiliary material from the second print head.

In some embodiments of the sixth aspect, the additive manufacturing can be fused filament fabrication (FFF). In some embodiments of the sixth aspect, the auxiliary material can comprise polymer-based material.

BRIEF DESCRIPTION OF THE DRAWINGS

For a better understanding of the present invention and to show more clearly how it may be carried into effect, reference will now be made by way of example to the accompanying drawings. The drawings are not necessarily to scale, emphasis instead being placed upon illustrating embodiments of the invention.

FIG. 1 is a block diagram showing an auxiliary material handling unit (AMHU) and a print head of an AM system.

FIG. 2A, FIG. 2B, and FIG. 2C show three build platform configurations, each in both top and side view. FIG. 2A and FIG. 2B show conventional configurations, whereas FIG. 2C shows an example of a new approach to handling auxiliary material employing an AMHU.

FIG. 3A and FIG. 3B are cross-sections of two different example AMHU configurations.

FIG. 4 is a cross-section of an example AMHU including a material displacer having an auger conveyor mechanism.

FIG. 7A is a cross-section of an example AMHU including a material displacer having a roller mechanism. FIG. 7B is a cross-section of an example AMHU configuration wherein two material displacers have roller mechanisms and communicate with respective dedicated collection reservoirs.

FIG. 8A, FIG. 8B, and FIG. 8C show three example collection reservoirs in cross-section. In all of FIG. 8A, FIG. 8B, and FIG. 8C, material displacers having a conveyor belt mechanism are shown for simplicity, but any other type of material displacer could be substituted. In FIG. 8A, the collection reservoir is a simple container having a casing and an interior volume. In FIG. 8B, the collection reservoir comprises a bag having an interior volume in which auxiliary material is collected. In FIG. 8B, the collection reservoir is integrated with a feedstock container (feedstock canister) in a feedstock container module.

DESCRIPTION OF EMBODIMENTS

Figure 5:
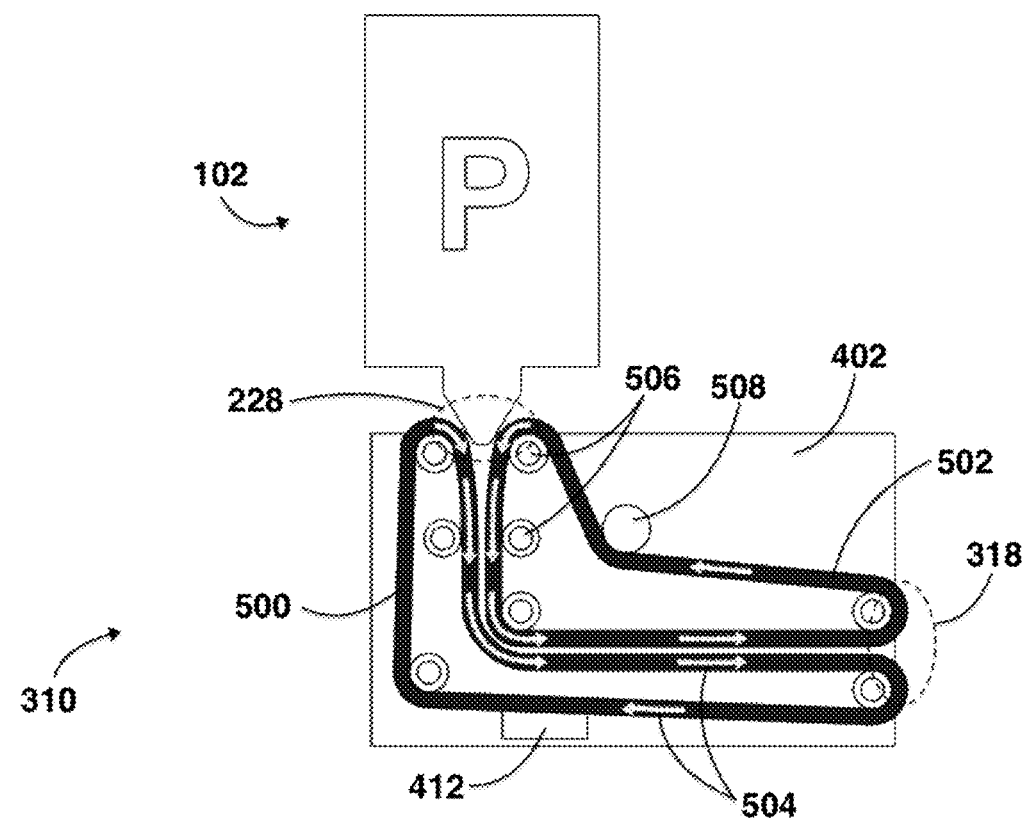
FIG. 5 is a cross-section of an example AMHU including a material displacer having a conveyer belt mechanism.

For convenience, the majority of the discussion herein will concern fused filament fabrication (FFF) using a 3D printer. However, the inventions disclosed herein are not limited to that type of additive manufacturing (AM) and are applicable in all AM technology families including, but not limited to, material extrusion (e.g., FFF), material jetting, stereolithography (SLA), selective laser sintering (SLS), binder jetting, direct energy deposition, sheet lamination, powder bed fusion, and automated knitting. They are also applicable to combination advanced manufacturing technologies that include AM, such as, for example, hybrid CNC mill and FFF systems that are able to deposit material additively and remove material subtractively. Moreover, when the terms "material is printed" or "material is deposited" are employed for the purposes of this disclosure, it should not be taken to refer only to material extrusion technologies. Rather, this more generally refers to material that is being committed to form a structure. For example, in SLA, material is not deposited as in material extrusion but rather is cured or solidified in a certain region. Similarly, in SLS, material is not deposited as in material extrusion but rather a region of pre-deposited material can be sintered to form a structure. For the purposes of this disclosure, we will consider this "printing" or "depositing".

Series enabled multi-material extrusion (SEME) technology is described U.S. application Ser. No. 14/831,396 to Debora et al., which published on Feb. 25, 2016 as US 2016/0052208, the entire teachings of which are incorporated herein by reference in their entirety.

For the purposes of this disclosure, the term "printed part(s)" refers to the component(s) being manufactured by additive manufacturing, especially by a 3-dimensional (hereinafter "3D") printer, and may include any other structures such as support material, waste structures or other relevant specimens constructed during the additive manufacturing (e.g., 3D printing) process. For convenience, sometimes the shortened version "part" is used interchangeably with "printed part". For the purposes of this disclosure, the term "fixturing" refers to securing a printed part to a desired position on a build platform.

For purposes of this disclosure, the term "tool path" not only encompasses movement of an AM tool head, but also deposition amounts and other relevant printing parameters of a given AM process.

For the purposes of this disclosure, the term "road" refers to a segment of printed material. For the purposes of this disclosure, the term "tool pathing" refers to the preparation of software code (generally, but not limited to, G-code) such that a 3D object is represented by coordinates used in additive manufacturing. This generally involves a mathematical slicing operation.

For the purposes of this disclosure, the term "build volume" refers to the maximum size (length, width, and height) of a part that a 3D printer can print. Generally, build volume is derived from the maximum limits of where the print head can move with respect to the build platform.

During a 3D printing process such as, for example, FFF, feedstock is deposited by a print head to form a printed part. However, there are a variety of circumstances where a print head will deposit some material that will not become part of the successfully completed printed part. This material will hereafter be referred to as "auxiliary material". Various types of auxiliary material will now be discussed.

One example of auxiliary material is material that is used to prime a print head. For example, in FFF, it is common that a printer will extrude/deposit material from the print head in order to prime the system. This is intended to help the system reach a steady state extrusion that provides more consistent printing. Currently, it is common for printers to deposit such auxiliary material directly onto a build platform near an edge in order for the material to stick to the build platform and not cause interference with the print process. One example of interference is the auxiliary material sticking to the print head and colliding with a printed part. Another example is the auxiliary material becoming lodged into the print head motion control system (e.g., belts, gears, rails), which could cause a print to fail and/or cause damage to the printer. However, depositing auxiliary material in this way takes up available space on the build platform, reducing the effective build volume. Also, deposition of auxiliary material can be difficult to control and it sticking to the print head difficult to avoid.

In another example, material extrusion systems that print low viscosity liquids or pastes often need priming to get rid of any air bubbles in the material. This includes, but is not limited to, printing of chocolate, silicone, conductive inks, ceramic slurries, concrete, etc. Another example of auxiliary material is material that leaks out of a print head, which is often called "ooze". For example, when a polymer is heated inside a print head of an FFF printer, it is common that some will exit/leak from the extruder nozzle in an uncontrolled manner. This ooze can cause interference as was described above. In AM systems that have multiple print heads, the phenomenon of oozing can be a significant issue. While one print head is actively printing, the rest of the print heads commonly wait idle, during which idle state the print head(s) can ooze. If this ooze is not controlled, it can be dragged back toward the printed part the next time the oozing print head is used to print. Moreover, the print head that oozed will have a portion of its inside empty, given that a certain volume of material had oozed out. In order to ensure consistent printing performance, it is often desirable to purge, and therefore prime, this print head prior to it printing. Accordingly, a system with four print heads that is printing a four-material product with 200 layers may require four purge actions per layer, and thus 800 in total.

In order to facilitate multiple purges during a print, a sacrificial structure is commonly created on the build platform adjacent the printed part, which structure is sometimes called a purge pillar or purge tower. A purge tower takes up area of a build platform, thus reducing the effective build volume for printing a part. It can also cause reliability issues. If the purge tower does not print properly (curls, warps, becomes dislodged from the platform, etc.), it can cause a print failure. The tower is also often required to be constructed on each layer of the print even if no purging is required on that layer, which increases operational costs by consuming material and adding printing time.

In another example, auxiliary material is generated when a first material is evacuated (e.g., deposited, extruded) from a print head in order to facilitate the loading of a second material. Commonly, when a feedstock is changed on a fused deposition modeling 3D printer, there is a transition region between where the first feedstock ends and the second feedstock begins that is a mix between both materials. Such a transition region is typically undesirable as it can have mixed properties of both materials and can lead to a lack of a sharp transition between different colors/materials in the printed part. Thus, transition material is an auxiliary material that can be purged from the print head. This is common in FFF 3D printing systems where feedstock material is manually changed. Also, as is described in Debora et al. US 2016/0052208, purging of a first material to allow the deposition of a second material can be involved in AM systems that automatically change from a first to a second feedstock. When a multi-filament part is fabricated using a single nozzle print head, auxiliary material may be generated each time the print head transitions between materials.

In some instances, auxiliary material is material that has been removed from a part during processing. For example, some advanced AM systems are able to subtractively mill parts during or after the AM process. In a specific example, an FFF printer that prints ABS parts is teamed with a CNC mill that machines the parts; any ABS shavings from the machining process will be auxiliary material.

In some instances, auxiliary material includes printed parts that were not successfully completed. For example, a power outage may have caused a printing process to fail and an incomplete part to be produced. In another example, a printed part may be deemed "unsuccessful" if it does not comply with the specifications required for the part. That printed part would then be auxiliary material.

In other examples, auxiliary material includes structures that are printed to aid in the printing of part. For example, it is common in some AM systems to print a platform, called a raft, onto which a part is printed. The raft is usually not useful after the part is successfully printed and may be considered auxiliary material. Similarly, printed fixtures, skirt, brims, supports, walls and other printed structures may be considered auxiliary material.

In some instances, auxiliary material includes material deposited by a print head of a 3D printer that is not deposited by a primary print head outlet. For example, Debora et al. US 2016/0052208 describes a feedstock valve device coupled to a print head that allows material to be directed away from a nozzle and optionally towards a repository. The diverted material may be considered auxiliary material.

In addition to purge towers discussed previously, other current means for handling some auxiliary material include "purge bins". These bins are more commonly used with industrial FFF 3D printers such as the "Fortus 450mc by Stratasys" or the "Cube Pro by 3D System" in which two print heads are respectively employed to print a primary build material and a secondary dissolvable support material. During the build process, each extruder commonly purges material into a purge bin directly below it that collects auxiliary material. A wiper may be employed to physically wipe extruded material from an extrusion nozzle and thereby prevent interference caused by auxiliary material. However, wipers (e.g., brushes) are known to need finely tuned height adjustment, and to wear out and need replacement. It is also known that the use of current wipers is not always reliable and that auxiliary material can cause interference despite the best efforts of a brush and purge bin system.

In addition, free deposition of auxiliary material into purge bins leads to a "bird's nest" style accumulation of auxiliary material that is very low density. Thus, purge bins need to be emptied regularly as they fill up rapidly. This requires manual labor and limits the maximum print length before requiring manual intervention.

Other current approaches for handling auxiliary material include using auxiliary material as a structural portion of a 3D printed part. For example, auxiliary material can be hidden within the internal geometry of a printed part as "infill". Alternatively, auxiliary material can be used to create a sacrificial structure(s) used to support a 3D printed part. However, there are various known issues with these approaches. First, auxiliary material can cause undesirable contamination if the properties of the auxiliary material are different from those of the material near which it is printed. For example, if a dark colored auxiliary material is being hidden as infill or support near an outer layer of clear material, the auxiliary material may be seen through the clear material or may leave residue on it. Second, such an approach depends on the existence of infill and/or support material on any given layer where auxiliary material exists. But, it is common that entire 3D printed parts or entire sections of 3D printed parts have no infill or support structures, and thus there would be nowhere to hide auxiliary material. Even if infill and/or support do exist, it is possible that the amount of auxiliary material is too much to be hidden as the infill and/or support. Accordingly, these auxiliary material hiding approaches only work under special circumstances and are not a robust, universal solution for what is needed.

As additive manufacturing becomes more prevalent, the generation of auxiliary material and the consequent need to handle such material will concomitantly increase. Multi-material printing is expected to become a standard offering in the majority of printers on the market, and thus there will be an increase in transition region auxiliary material. It is also expected that printers will become faster and larger, which means that more auxiliary material will be generated than ever before. Business models are being developed around use of 3D printers for batch manufacturing, and thus some printers are being run continuously, which also contributes to a larger amount of auxiliary material being generated per day.

There is a need to reduce manual intervention involved in AM, particularly manual labor associated with the handling of auxiliary material. There is also a need to provide more reliable approaches to handling auxiliary materials, particularly to reduce interference with printing.

The present disclosure relates to an auxiliary material handling unit (AMHU) for additive manufacturing systems and methods of use thereof. In various embodiments, efficiency and/or reliability of an AM system are increased and/or need for maintenance and/or human intervention is decreased. Broadly, an AMHU comprises a material displacer that receives auxiliary material from an AM system, typically from a print head. By "receives auxiliary material from an AM system", it should be understood that auxiliary material generated by an AM system that it loaded by hand (e.g., a raft, a failed part) is not excluded. The material displacer has at least one entry port and preferably at least one exit port. Auxiliary material displaced by the material displacer away from the entry port, e.g., from the exit port, may be passed into a collection reservoir. The AMHU may also include a material processing unit and/or other components.

Also, an active print head cleaning device is provided that can actively clean an AM print head, i.e., remove residue or other auxiliary material from the print head. The removed material may be displaced from the print head area by a material displacer. The removed material may be collected and/or reused.

Multiple embodiments of the inventions will be described below with the accompaniment of figures. Most figures are shown in block diagram or in partial cross-section.

FIG. 1 is a block diagram showing an auxiliary material handling unit (AMHU) 100 and a print head 102 having a printing nozzle 104. The print head 102 is positioned near the AMHU 100 such that the AMHU can receive auxiliary material from the print head as it is deposited.

FIG. 2 shows three build platform configurations, each shown in both top and side view. FIG. 2A depicts a conventional configuration; the upper section is a top view of build platform 206 with a purge tower 212 of auxiliary material printed onto it. Because the purge tower occupies a portion of the build platform, the area to the left of dotted line 210 is unavailable for a printed part. That is, the effective build volume for a printing a part has been decreased. The lower section of FIG. 2A is a side view of the same build platform 206 with print head 102 positioned above the purge tower portion of the build platform.

FIG. 2B shows another conventional configuration. The upper section is a top view of build platform 214 with a purge bin 220 and wiper 218 both adjacent the build platform. It can be seen that in order to accommodate the purge bin 220 within an equivalent build volume to that shown in FIG. 2A, the width of the build platform 214 has had to be reduced. Dotted line 216 shows the build platform area lost to accommodate the purge bin. The lower section of FIG. 2B is a side view of build platform 214 with purge bin 220 adjacent. Print head 102 is positioned above the purge bin 220, i.e., where it would be if it were depositing auxiliary material into the purge bin.

As discussed, the free deposition of auxiliary material often leads to uncontrolled and unpredictable behavior. When, for example, auxiliary material polymers are deposited from FFF print heads, the material commonly forms a low density "bird's nest" of material that accumulates very quickly. For this reason, it is important that the purge bin be of a substantial size. This often leads to the purge bin being quite deep, as is shown by dimension 222 in FIG. 2B, in order to increase the purge bin volume without taking up even more build platform space. Ultimately, the size of a purge bin is limited by the maximum that dimension 222 can be, as well as the space available to the side of the build platform. The unpredictable nature of material accumulation in the purge bin means that sometimes the material will settle efficiently, but other times it will get lodged near the top of the bin and effectively accumulate much faster, potentially compromising the print. There are no sensors associated with purge bins, which means that even more frequent manual monitoring and emptying are required to cope with the cases of inefficient material accumulation. This manual labor can be costly and can delay AM throughput, particularly when manual intervention does not occur at junctures where it is needed.

FIG. 2C shows an example of a new approach to handling auxiliary material. The upper section of FIG. 2C is a top view of build platform 224 with an AMHU 100 adjacent to it. Dotted line 226 indicates a relatively small amount of build platform area lost to accommodate the AMHU, as compared to the situation depicted in FIG. 2A. Note that the AMHU 100 has an entry port 228 that is within the dotted line 226 (within the build volume) and is thus accessible by the print head. Unlike approaches employing a purge bin, where a print head needs to be roughly centered over the purge bin when depositing auxiliary material, with an AMHU the print head only needs to access the entry port 228. The lower section of FIG. 2C is a side view of the build platform 224 wherein the print head is positioned above the entry port 228 of the AMHU 100.

Although the purge bin 220 and the AMHU 100 are shown in FIG. 2B and FIG. 2C as being fixed to build platforms 214 and 224, respectively, they can alternatively be separate. In some AM systems, a build platform can move up and down relative to one or more print heads, in which case the build platform may move relative to the purge bin or AMHU.

FIG. 3 shows a more detailed view of an example AMHU. FIG. 3A shows an AMHU 100 with a casing 304 and entry port 228. The entry port 228 is where auxiliary material is received by the AMHU. From the entry point 228, material passes to material displacer 310, and subsequently to exit port 318. The primary function of the material displacer is to displace material away from the entry port 228. That is, material is actively displaced by the material displacer, rather than movement of the material being achieved by simple gravity or simple accumulation of additional material behind. Various embodiments of material displacing will be discussed below. In various embodiments of an AMHU, the exit port can be connected to a material processing unit 312 that modifies the material before it is passed to collection reservoir 320.

Adjacent the entry port in the depicted embodiment is a membrane 306 that partially constrains the area about the entry port 228. It has been shown that positioning a print head close to a membrane such that the material being deposited passes through the membrane can help stop the material from adhering to the print head. In a sense, the membrane 306 acts as a one-way valve helping to keep auxiliary material inside of the AMHU 100. The membrane could be made from a variety of materials including, but not limited to, high temperature silicone, TEFLON, PEEK, glass, stainless steel. The membrane can have an aperture in it such as, for example, a punctate opening or a channel. In an embodiment, the membrane is made of a flexible material and has a punctate opening in it that is smaller than the circumference of the nozzle of an FFF print head. When the nozzle is pressed into the membrane, the opening could stretch around the nozzle, allowing the nozzle to pass through and forming a seal.

In many embodiments, the AMHU 100 further includes a sensor or sensors 308. The sensor(s) 308 can monitor activities performed by the AMHU and/or by the 3D printer, and/or the material passing into the AMHU. The sensors(s) can be connected to AMHU controller 316 or to another controller, such as, for example, the controller of an AM system with which the AMHU is being used. The controller can use feedback from the sensor(s) to control operation of the AM system or the AMHU.

In some embodiments, the sensor(s) 308 can be used to detect the presence of a print head at the entry port 228 of the AMHU in order to activate the material displacer 310. In some embodiments, the sensor(s) 308 can detect accumulation of auxiliary material outside of the membrane 306 that could cause interference with the print head. In some embodiments, the sensor(s) 308 can detect jams in the material displacer 310. In some embodiments, the sensor(s) 308 can monitor the properties of material being deposited into the AMHU, such as, for example, temperature, color, viscosity, composition, density, humidity, etc. In some embodiments, the sensor(s) 308 can monitor material volume entering the AMHU. In some embodiments, the sensor(s) 308 can monitor the print head to ensure that no auxiliary material has accumulated on it that could cause interference.

In some embodiments, the sensor(s) 308 can detect foreign objects that enter the AMHU. For example, a camera could detect a human finger or a steel bolt as it passes into the system and then cause the system to stop. This could prevent harm to a human as well as to the system.

In some embodiments, the sensors(s) 308 can detect the position of the print head in order to ensure it is correctly aligned with the entry port 228 of the AMHU. The data from the sensor(s) can be used to initiate automated or manual correction where required. For example, if the print head is not properly aligned with the entry port 228, the misalignment data can be passed to the controller of the 3D printer for realigning of the print head. In some embodiments, the AMHU or components of the AMHU can be articulated using mechanical actuators (not shown), allowing the AMHU or AMHU components to move relative to the printer and/or relative to the build volume and/or relative to one or more print heads. In this case, the sensor data could be used to apply a correction to the position of the AMHU relative to the print head to facilitate reliable handling of auxiliary material. In another example, if the print head is not properly aligned with the entry port 228 and automatic realignment is not possible, the misalignment data can be sent to maintenance personnel so that they could make any necessary adjustments to the calibration of the AMHU or AM system.

The ability of the AMHU or components of the AMHU to be articulated can provide value in a variety of ways. For example, this ability can be used to ensure a print head is well positioned relative to membrane 306 and/or entry port 228 so as to facilitate reliable performance. This ability can also be used to move the AMHU away from a build platform when not in use. The AMHU could articulate onto the build platform in order for a print head to access it and then, once all auxiliary material had been deposited into it, the AMHU could articulate out of the build volume. In some embodiments, in order to ensure that the AMHU does not collide with a printed part, the build platform could for example lower or move in another direction to prevent such a collision. The ability of the AMHU or components of the AMHU to be articulated could also be useful for a printer that has more than one print head. The AMHU could move until its entry port is aligned with each print head so that auxiliary material can be reliably processed from each. Otherwise, the print heads would all need to be able to access the AMHU which require complex gantry system; alternatively, multiple AMHU's could be employed.

As noted above, in some embodiments, auxiliary material can pass from the exit port 318 of the material displacer 310 to a material processing unit 312. For example, the material processing unit 312 can include a grinder. Grinding the material may allow it to be more efficiently packed or stored in the collection reservoir 320. Grinding may also make the material easier to recycle.

In some embodiments, the material processing unit 312 can act to stabilize the auxiliary material and/or make it safer. For example, it is known that some photopolymers used in SLA can be dangerous for a human to handle until they have been cured under ultraviolet (UV) light. An example material processing unit 312 can expose such auxiliary material to UV light to ensure it is safe before it is passed into the collection reservoir. In another example, it is known that some powder materials used in SLS can be dangerous to for a human to inhale. An example material processing unit 312 can contain jets that create a mist that helps to settle the powder and make it safer for a human to handle. In some embodiments, the material processing unit 312 can include a filter that separates materials that enter it. For example, if a liquid is being used as a medium to transfer powder from one site to another, the material processing unit could filter the powder out of the liquid for separate storage.

In some embodiments, the material processing unit 312 can melt the auxiliary material. Melting the material may allow it to be stored more efficiently, e.g., as a liquid rather than as a solid. In some embodiments, the material processing unit 312 can reform the auxiliary material into a format that is ready for recycling or reuse. For example, auxiliary material from an FFF 3D printer could be reformed into a filament feedstock that can be reused by the 3D printer. In another embodiment, the material processing unit 312 can dry the auxiliary material. Drying the material may lead to more efficient storage and/or may make it ready for reuse.

In some embodiments, the material displacer 310 can pass material directly into the collection reservoir 320. The collection reservoir 320 is where auxiliary material is accumulated, as will be discussed in more detail below. A sensor or sensors 314 can also be provided. In some embodiments, the sensor(s) 314 can monitor the properties of the material entering the collection reservoir and send the data to a processor. For example, feedback can be used to ensure that the material processing unit 312 is functioning correctly. The sensor(s) 314 can also be used to monitor the amount of material in the collection reservoir 320. For example, a weight sensor can measure the mass of material in the collection reservoir 320; a force sensor can monitor the density of the material accumulating in the collection reservoir 320. In some embodiments, the AMHU can be an internet of things (IOT) device wherein the sensor data is processed online and used to alert AM system maintenance staff to empty the collection reservoir 320.

In some embodiments, the sensor(s) 314 can be used to measure the properties of the material in the collection reservoir 320, including, but not limited to, temperature, humidity, conductivity, acidity, alkalinity, composition, etc. Feedback from the sensor(s) 314 can lead to the automated or manual emptying of the collection reservoir 320. The sensor(s) 314 can be connected to the AMHU controller 316 or to another controller, such as, for example, the controller of an AM system with which the AMHU is being used.

In some embodiments (not shown), the sensor(s) 308, 314 can be connected to a light or a sound generator (e.g., alarm buzzer) that notifies a user of the sensed state of the AM system, the AMHU, or the auxiliary material In some embodiments, the collection reservoir 320 can include a material agitation mechanism (not shown) inside or at the collection reservoir. The material agitation mechanism can be used to distribute auxiliary material to increase storage efficiency. It is known that many types of auxiliary material accumulate in unpredictable ways, resulting in low density storage. In many cases, the material displacer ameliorates this situation, as it feeds auxiliary material into the collection reservoir with some force, resulting in some compression and compaction of the material in the collection reservoir. As noted above, this differs from typical approaches that rely on the limited deposition force of a material coming out of a print head and/or gravity in to compact auxiliary material. In some cases, however, the auxiliary material could potentially still accumulate at a higher density near the exit port 318 of the material displacer 310. In such cases, a material agitation mechanism can help to distribute the auxiliary material more evenly in the collection reservoir. There are a variety of material agitation mechanisms that could achieve this outcome, some of which will now be discussed.

In some embodiments, a material agitation mechanism can include a vibrator that causes one or both of the collection reservoir and the auxiliary material inside it to vibrate. This approach is employed in diverse situations such as the pouring of concrete and the storing of pellets in a hopper to cause the materials to spread out more evenly. In some embodiments, the material agitation mechanism can include an agitation member that passes through the auxiliary material, similarly to how a food processor agitates its contents with one or more rotating forks. The agitation member can mechanically force the material around to redistribute it. In some embodiments, the material agitation mechanism can include a material compactor that can compress the material in the collection reservoir, similarly to a garbage truck uses a compressor, e.g., a pneumatically actuated compressor, to compact garbage. For example, a plate at one side of the collection reservoir could move within the collection reservoir to compress the auxiliary material into a smaller volume. In some embodiments, the material in the collection reservoir could be compressed similarly to a vacuum sealing bag. In various embodiments, agitation and/or compaction could be done periodically.

The ability of the AMHU to receive auxiliary material and reliably displace it permits, in many cases, an AM system to deposit auxiliary material more rapidly. Currently, deposition of auxiliary material onto a purge tower is limited by both how fast the printer is able to move the print head and how fast it is able to deposit material to form, for example, a road. It is known that this volumetric material deposition speed (printing speed) is often less than the speed of free depositing material. Accordingly, free depositing material into a purge bin can be faster than depositing onto a purge tower, but it is still limited to a maximum practical speed to ensure that auxiliary material moves away from the print head and does not curl up. With an AMHU, however, speed is limited by the ability of the print head to deposit material, but print head movement and reliability of material moving away from the print head will not be significant factors; thus, auxiliary material can likely be deposited more rapidly than for purge towers or purge bins. This can help reduce print times and, consequently, cost. In some situations, for example, when an FFF printer is printing a polymer, it may be advantageous to increase the temperature of the print head during auxiliary material deposition to reduce viscosity of the polymer and allow it to be deposited faster. In some embodiments, a heating element (not shown) is provided that can provide rapid heating of the print head so as to further increase its material deposition rate.

In the figures, components of an AMHU are depicted in particular configurations for the purpose of example, but it is to be understood that this disclosure is not limited to the configurations depicted. For example, in certain embodiments, a material processing unit 312 can be positioned before the material displacer 310. For example, if unsuccessfully printed parts are being fed into an AMHU, it may be desirable to have a material processing unit grind them into smaller shavings that can be processed by the material displacer or another component of the AMHU. In some embodiments, there can be multiples of certain components of the AMHU. For example, there can be an intermediate collection reservoir where material accumulates before entering the material processing unit 312, for more efficient energy use by the system. In some embodiments, there can be two or more material displacers 310 feeding into a communal collection reservoir 320. In some embodiments, there can be multiple entry ports to the same material displacer 310.

In some embodiments, a material displacer 310 is provided after a collection reservoir 320. This material displacer displaces the material in the collection reservoir to another location, e.g., to a larger collection reservoir. In an example, multiple AM systems can have their collection reservoirs automatically emptied by respective material displacers into a centralized location for further processing and/or storage.

FIG. 3B is a side view of an AMHU configuration wherein material displacer 310 has an entry port 228 that is substantially separated from exit port 318. This allows the collection reservoir 320 to be substantially separated from the entry port 228 of the material displacer and thus from the outlet of the print head, something that is not possible for typical auxiliary material handling means (i.e., purge towers, purge bins). In FIG. 2C, for simplicity the entire AMHU 100 is shown near the build platform; however, unlike the purge bin 220 of FIG. 2B, it does not need to be there. Separating the collection reservoir 320 from the region near the print head provides flexibility in printing system design that is not available with approaches such as purge bins. This means that the collection reservoir can be positioned in a variety of locations in the 3D printer or in the vicinity of the 3D printer, and accordingly that the maximum auxiliary material storage volume can be larger. It should also be noted that, although the path of the material displacer 310 in FIG. 3B is shown as two-dimensional for simplicity, in some embodiments the path can traverse three dimensions. Such flexibility can lead to more compact AM system designs with higher build volume-to-system volume ratios.

Referring again to FIG. 3B, an active print head cleaning device 330 is provided at entry port 228, rather than the membrane 306 depicted in FIG. 3A. The active print head cleaning device 330 can actively clean the print head, i.e., remove residue or other auxiliary material from the print head. In some embodiments, the auxiliary material that has been cleaned off can be passed into the material displacer 310 and then displaced to the collection reservoir 320 with other auxiliary material. Optionally, the collected material can be recycled or reused. In some embodiments, the active print head cleaning device 330 can include one or more motor-driven brushes that remove residue from the print head. In some embodiments, the active print head cleaning device 330 can include one or more streams of compressed air or another fluid that force residue off of the print head. In some embodiments, the active print head cleaning device 330 can include one or more vacuum devices that remove residue from the print head. It is known that maintaining a clean print head helps to provide reliable printing, including preventing contamination of printed parts.

The AMHU with the active print head cleaning device provides a system with advantages over currently available simple print head cleaning tools. For example, Turley et al. US2008/0317894 and Chang US2015/0158254 describe certain print head cleaning tools. However, in both cases, there is little or no control over where removed residue goes. This material may accumulate on the tool, and accumulation of the material could potentially cause interference with the AM system. Prior to this disclosure, print head cleaning approaches have not involved displacement and collection of removed material. Current tools can be adapted for use in AMHU processes.

As indicated above, the material displacer 310 can employ various mechanisms to displace material received at the entry port 228 to another location, ordinarily the exit port 318. In many embodiments, the material displacer comprises a movable element and an actuator, preferably automated, for displacing the auxiliary material. Several examples of material displacers will be discussed below.

FIG. 4 is a cross-section of an example material displacer 310 having an auger conveyor mechanism. Auxiliary material enters the material displacer 310 at entry port 228 which can be an opening in casing 402 exposing auger screw 400. Although a single such opening is shown in FIG. 4, the casing 402 could have multiple openings that expose the auger screw, providing multiple entry ports 228 to the material displacer 310. In some embodiments, this could allow multiple print heads to use the AMHU, optionally at the same time. In some embodiments, different types of entry ports can be provided, the different ports being better suited to different print heads. In some embodiments, providing multiple openings can reduce travel time for the print head to reach an entry port as the print head could go to the closest or most convenient one at any juncture in the print process.

The auger screw 400 can be driven to rotate by motor 414. The rotation drives auxiliary material along the screw 400 in the direction indicated by arrow 404. Sensor 412 by the motor 414 can provide closed loop feedback. In embodiments such as that depicted in FIG. 4, the auxiliary material will be deflected by about ninety degrees to take the path indicated by arrow 408 and move toward exit port 318. The curved section 410 inside of the casing 402 can act to deflect material downward as it is driven along the screw 400 towards the curved section. An adjustable blade 406 can be positioned near the end of the screw 400 to decrease any accumulation of material on the screw 400.

For some AM processes, it is desirable to have a controlled environment, including but not limited to control over pressure, temperature, humidity, light conditions, etc. In order to help isolate the environment in the AM system near the entry port 228 from that at the exit port 318 in cases where the exit port is outside of the controlled environment, the clearance 418 between the screw 400 and the casing 402 can kept substantially small. This could, for example, limit the amount of humid air that can travel backward through the material displacer into the AM system.

In some embodiments, a sensor or sensors 412 is/are provided. The sensor(s) can be positioned at any desirable location inside or outside of the material displacer 310, for example, near the exit port 318 and/or the motor 414, both of which are shown in FIG. 4. In the case where there are multiple sensors, they can be distributed or centralized relative to the material displacer.

FIG. 5 is a cross-section of another example material displacer 310 having a conveyer belt mechanism. Auxiliary material can enter the material displacer 310 at entry port 228 where belts 500 and 502 are exposed through casing 402. Auxiliary material can be deposited into a gap between the belts 500, 502. The belts 500, 502 can be actuated by a motor-actuated driving wheel 508 in the directions indicated by white arrows 504. The auxiliary material between the belts 500, 502 will be moved from the entry port 228 to the exit port 318 where it will separate from the belts 500, 502. The belts 500, 502 can be made of a material that does not adhere to the auxiliary material, such as, for example, polyurethane, Buna-N rubber, high temperature silicone, or the like. The belts 500, 502 can be smooth belts or can have teeth on one or both sides. In some embodiments (not shown), a material displacer 310 can have a single belt or multiple belts (i.e., two or more). In order to guide their path, the belts 500, 502 can travel in a channel (not shown) inside the casing 402 and/or they can travel around bearings 506.

In order to facilitate separation of the auxiliary material from the belts 500, 502, the casing 402 at the exit port 318 can be sufficiently close to the belts 500, 502 to scrape off material and/or to inhibit it passing back into the material displacer. In some embodiments, a brush (not shown) can be positioned near or in contact with the belts 500, 502 to inhibit residue from building up on them. In some embodiments, another type of wiper (e.g., scraper, squeegee; not shown), can be in contact with the belts 500, 502 to help prevent liquid or gel auxiliary material from adhering to the belts 500, 502 past the exit port 318. Tight tolerance can also help isolate the environment at the entry port 228 from that at the exit port 318, as was discussed previously.

Optionally, the spacing between the belts 500, 502 can change as the material travels through the material displacer, so that the material is compressed or formed. In some embodiments, the belts can gradually converge so that they crush material as it passes through the material displacer. In some embodiments, the belts can travel at different rates in order to agitate the material between them, causing it to be broken down. In some embodiments, the belts can interlock to form two sides of a mold with a defined cavity between them into which the material is forced. This can cause the material to become pelletized. The foregoing are examples wherein a material displacer of an AMHU is also a material processing unit 312.

In some embodiments, a sensor or sensors 412 is/are provided. The sensor(s) can be positioned at any desirable location inside or outside of the material displacer 310. In the case where there are multiple sensors, they can be distributed or centralized relative to the material displacer.

In FIG. 5, the nozzle of the print head 102 is shown in contact with the belts 500, 502. This is an example wherein a material displacer 310 provides an active print head cleaning device 330. In this example, as the belts 500, 502 rotate they will scrape auxiliary material off of the surface of the nozzle and move it away from the nozzle. It has been shown through testing that this is an effective way to clean the print head and that substantially all material that is removed from the print head is displaced away from it. Advantageously, the cleaning of the print head can take place when the print head is stationary and also when the print head is depositing auxiliary material. For example, at the beginning of a 3D printing process wherein a print head needs to purge auxiliary material to prime the print head, the print head could be simultaneously cleaned.

Figure 6:
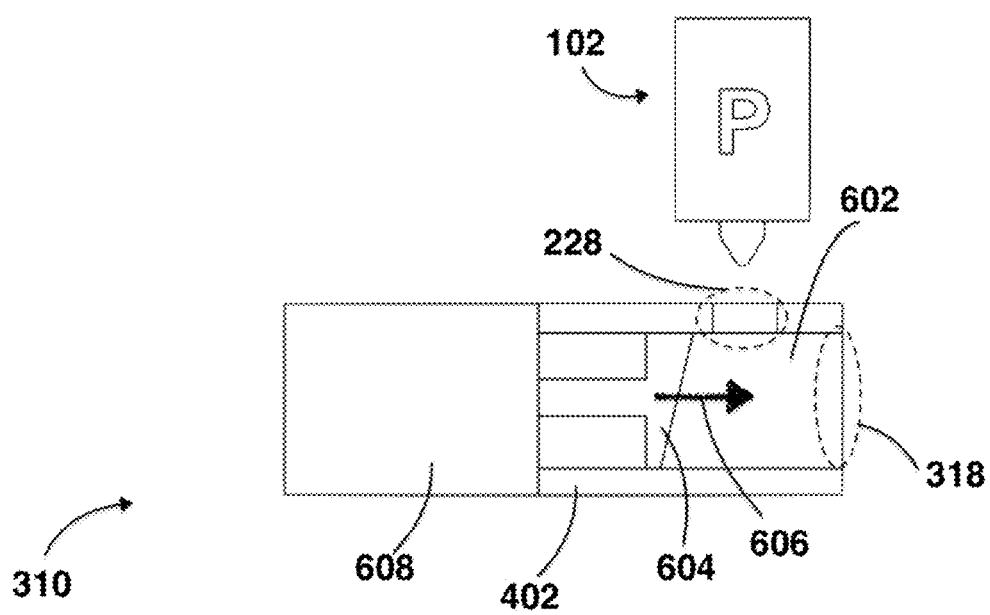
FIG. 6 is a cross-section of an example AMHU including a material displacer having a plunger mechanism.

FIG. 6 is a cross-section of another example material displacer 310 having a plunger mechanism. Auxiliary material can enter the material displacer 310 through entry port 228 and accumulate in volume 602 within the casing 402. The auxiliary material within the volume 602 can be displaced by plunger 604, which can be actuated by actuator 608 in the direction of arrow 606 so that the auxiliary material leaves through exit port 318. In some embodiments, the plunger 604 can have an angled face as is shown in FIG. 6 in order to deflect material downward and away from entry port 228. If desired, a stroke of the plunger 604 can be long enough for the plunger to pass through exit port 318 in casing 402 to ensure that the auxiliary material is completely out of the volume 602. Timing of the plunger motion can be coordinated with the AM system to ensure that no auxiliary material is deposited into the material displacer while the plunger is such extended position. In some embodiments, the plunger 604 can be controlled by an electromechanical solenoid that can rapidly actuate the plunger.

Although in the depicted example the plunger 604 travels in a linear path, the plunger could travel in various paths including a nonlinear curved path. For example, the plunger could be mounted to an arm (not shown) connected to a motor shaft such that the plunger swings past the entry port 228.

In some embodiments, the displacement of the auxiliary material in the void 602 can be caused by means other than a mechanical movable element and actuator, e.g., a plunger. For example, a pressurized flow of material, such as but not limited to, air, sand, water, oil, etc., can be directed toward the exit port 318 in order to displace the auxiliary material toward the exit port. In some embodiments, a fan can provide air flow away from the entry port.

In some embodiments, a sensor or sensors (not shown) are provided. The sensor(s) can be positioned at any desirable location inside or outside of the material displacer 310. In the case where there are multiple sensors, they can be distributed or centralized relative to the material displacer.

In some embodiments (not shown), a material displacer can include a peristaltic pump mechanism. Auxiliary material can enter a flexible tube of the material displacer through entry port 228. The tube can be periodically compressed by the peristaltic pump mechanism to force the material through the tube from the entry port to the exit port 318.

FIG. 7A is a cross-section of an AMHU including an example material displacer 310 having a roller mechanism. Auxiliary material can enter the material displacer 310 through entry port 228. Rollers 708 and 710 mounted to casing 402 can rotate in the directions of their respective arrows so that the auxiliary material is drawn into the material displacer and toward the exit port 318. The rollers 708, 710 can be powered by one or more motors 714. Wipers (e.g., scrapers) 322 can remove material from the rollers so that material being drawn in by the rollers does not exit the material displacer 310 through the entry port 228. Although two rollers are shown in this example, in other embodiments the material displacer 310 can include a single roller or alternatively more than two rollers. The rollers 708, 710 can be made of any convenient material, such as, for example, steel, high temperature rubber, aluminum, PEEK, TEFLON, or ceramic. The rollers 708, 710 can be smooth or can have grooves or other texture on them. The wipers 322 can be of rigid material (e.g., steel) or flexible material (e.g., rubber) and/or can include a brush, e.g., a steel bristle brush.

The rollers can be configured to grind, pelletize, mix, or otherwise reshape the auxiliary material as was described above regarding the material displacer comprising a conveyor belt. The temperature of the rollers (as well as any other part of the AMHU) can be controlled in order to enhance the performance of the system. For example, in an AMHU being used with an FFF system depositing a polymer, it may be advantageous to maintain the AMHU at, for example, about 10 degrees Celsius in order to help the auxiliary material solidify more rapidly after deposition by a print head. This may also help the auxiliary material become brittle and thus easier to grind or process in another way.

Referring again to FIG. 7A, a collection reservoir 320 with casing 324 is shown below the material displacer 310. In this example, the collection reservoir 320 has a first section 326, a second section 328, and a third section 329, though it should be understood that it could have any convenient number of sections. In the depicted embodiment, the collection reservoir and material displacer can move relative to each other in directions indicated by arrow 332, such that each of the collection reservoir sections 326, 328, 329 can be aligned with the exit port 318 of the material displacer 310.

Having multiple collection reservoirs or collection reservoir sections that are accessible by a material displacer may provide a number of advantages. For example, auxiliary material could be sorted; i.e., specific collection reservoirs could be assigned for different materials deposited by the print head 102. In a specific example, in an AM process where ceramic paste, ABS plastic, electrically conductive gel, and TPE are being used together, a four-section collection reservoir could be provided wherein each material has its own section. This could help with recycling of the various materials. For example, the separately collected ceramic paste could be loaded into a paste syringe and reused in a later print, whereas if the paste had become mixed with the other gels and solids in a single collection reservoir, it would likely have become waste.

In another example, the sorting of auxiliary materials may be useful to help the materials remain stable. For example, certain different materials may react if stored together, so keeping them separate could be advantageous, perhaps even increasing safety of the system.

Also, having multiple collection reservoirs or collection reservoir sections may be advantageous by providing a larger total collection volume. For example, in a system where geometric constraints limit the maximum size of a single collection reservoir, multiple sections may be used so that when section is full, another one can be positioned at the exit port 318. It is worth noting that, although the collection reservoir 310 of FIG. 7A is shown to have a single casing 324 with multiple sections in it, in other embodiments, there could be two or more separate collection reservoirs that are not the same object.

Another example AMHU configuration is depicted in FIG. 7B, which is a cross-section showing two material displacers 310 having roller mechanisms, the material displacers communicating with respective dedicated collection reservoirs 320. In some embodiments, a single print head can use either of the two AMHU's depending on the particular material being deposited, in order to sort different materials. In some alternative embodiments, two separate print heads can be employed wherein each print head has its own dedicated AMHU. This could be advantageous in that the two print heads could deposit auxiliary material in parallel and thereby save time.

Conveniently, in a system where there are multiple print heads but not all are printing at the same time, any idle print head(s) can remain at an AMHU so that any material that leaks from the print head(s) is consumed immediately by the AMHU.

Although two AMHU's are shown in FIG. 7B, it is to be understood that any number of AMHU's can be present in an AM system. Also, features of the configurations shown in FIGS. 7A and 7B can be combined such that an AM system can have multiple AMHU's and the AMHU(s) can include multiple collection reservoirs or a collection reservoir having multiple sections.

Users can choose an appropriate AMHU set-up depending upon the material(s) employed in a given fabrication task. In an example, a gel, a powder, and a polymer thermoplastic are being deposited in the same fabrication task. The gel may require a heated water-tight collection reservoir to permit dense storage of the material; the powder may require a collection reservoir maintained under argon gas in order to stabilize the powder over time; and the polymer may require a collection reservoir with a mechanical compressor, as discussed above. In some embodiments, this fabrication task can be accomplished using an AMHU comprising a single material displacer and multiple collection reservoir sections that are respectively adapted for the specific material type they will receive (similar to FIG. 7A).

In another example fabrication task, the material types are so different (e.g., an epoxy and a thermoplastic polymer) that different types of material displacers are preferred. Here, multiple AMHU's can be provided (similar to FIG. 7B), each AMHU being adapted for a specific material type. Viewed another way, instead of just requiring multiple collection reservoirs or collection reservoir sections, the task requires multiples of another element(s) of an AMHU.

In general, AMHU's can be designed to be conveniently modular so that elements thereof could be swapped out either manually or automatically, permitting customization for any given AM task.

It is to be understood that although the above discussion refers to the roller style material displacer exemplified in FIGS. 7A and 7B, it is equally applicable to AMHU's having any other material displacer mechanism. For example, in some embodiments, multiple collection reservoirs and/or collection reservoir sections can be employed with one or more material displacers having a conveyor belt.

Continuing the discussion of different material displacer mechanisms, in another example (not shown), a material displacer can have a vacuum mechanism that causes displacement of auxiliary material from entry port 228 to exit port 318. A print head can be positioned near the entry port such that material deposited from the print head is pulled into the material displacer by the vacuum mechanism. This may be particularly useful for non-solid materials, such as, but not limited to, uncured concrete, epoxy, silicone, ink, edible batters, ceramic slurries, paints, or the like. In some embodiments, a vacuum mechanism with suitable suction can actively clean the print head of any residue that may have accumulated on or near the print head.

In some embodiments, a vacuum mechanism can be attached to the print head and may optionally articulate toward and away from the region where material is deposited by the print head. Accordingly, auxiliary material could advantageously be removed in situ rather than requiring the print head to move to a stationary entry port for the vacuum mechanism. Articulation of the vacuum mechanism, e.g., automated articulation, could help ensure that it does not interfere with a printing of a part.

Approaches wherein an AMHU or an AMHU module is fixed to a print head and can optionally articulate with respect to the print head are not limited to vacuum mechanisms and can be employed with all other systems.

FIG. 8 shows a variety of example collection reservoirs 320 in cross-section. Although material displacers 310 having a conveyor belt mechanism are shown in all three panels of FIG. 8, this is done for simplicity, and any other type of material displacer could be used.

In FIG. 8A, the collection reservoir 320 is a simple container having a casing 324 and an interior volume 814. The casing 324 has an opening through which exit port 318 of material displacer 310 passes so that auxiliary material 810 can enter into the volume 814. In some embodiments, the collection reservoir 310 can have a hinged door 812 that can be used to empty the contents of the collection reservoir.

It should be noted that there is no scale limitation as to what constitutes a collection reservoir. In an extreme example, if an AMHU were set up so that the material displacer moved material from a print head and dispensed it onto the floor near the AM system, then the room or at least the region near the AM system could be a collection reservoir.

In FIG. 8B, an alternative collection reservoir 310 is shown wherein a bag 820 is used to collect auxiliary material 810 in its volume 814. In some embodiments, the bag 820 can conveniently be attached to the material displacer 310 to receive the exit port 318, for example, by securing the bag 820 to grooves 828 on the material displacer 310. Using bags as collection reservoirs could be practical for a number of reasons. For example, bags tend to be low cost, and generally they can be folded and be stored in a small volume. Potentially dozens or hundreds of collection reservoir bags could be stored in a box near an AM system. In some embodiments, the bags could be made of a similar material to the material being deposited in the AM system, such that both the bag and its auxiliary material contents could be recycled together when the bag is full. In some embodiments, the bags could be vacuum-sealable bags. Bags that had been vacuum-sealed could be smaller and thus more efficiently stored. The vacuum could be applied during an AM process as a bag is being filled, or after the bag is full and has been removed from the material displacer 310.

In some embodiments (not shown), a material displacer and a collection reservoir are integrated and configured such that the material displacer does not impede emptying of the collection reservoir. For example, the material displacer or the collection reservoir could swing out of the way during emptying with a hinge mechanism. In some embodiments, the material displacer integrated with a collection reservoir can comprise a movable element and an actuator for displacing and compacting auxiliary material.

In some embodiments, a collection reservoir can be co-located with or within a module of an AM system. In the specific example shown in FIG. 8C, the collection reservoir 320 is integrated with a feedstock container (feedstock canister) 838, where feedstock is loaded in certain AM systems. The feedstock container 838 is of the type sometimes called a filament cassette or a filament cartridge. It has a body 836 and a feedstock storage compartment 840 containing a filament spool 842 around which filament 844 is wrapped. Although in this example the feedstock is filament, feedstock can be, but is not limited to, a powder, resin, gel, pellet, sheet, or the like. Integrated with and above the feedstock container 838 is a section into which a material displacer 310 passes such that its exit port 318 is inside volume 814, allowing auxiliary material 810 to enter the volume 814. Accordingly, this section is a collection reservoir.

Integrating a collection reservoir into a module of an AM system such as, for example, a feedstock container, may provide certain practical, economic, and/or environmental advantages. The loading and unloading of feedstock containers at regular intervals is standard behavior for AM system users. User experience may be improved if a feedstock container and a collection reservoir were switched out with the same motion, as opposed to having to empty a collection reservoir in addition to having to switch feedstock containers. Accordingly, the volume of a collection reservoir co-located with a feedstock container could be selected so that the depletion of the feedstock container and the filling up of the collection reservoir are approximately synchronized.

Feedstock containers are commonly recycled; some are even returned to the manufacturer and reused. In this case, the manufacturer could empty auxiliary material from one or more collection reservoirs within a feedstock container module and use the material again. Such use may include repurposing the material in an environmentally friendly way, or using it as a raw material in the production of new feedstock. Accordingly, material that would have been sent to a landfill could be more efficiently recycled, reprocessed, and potentially sold for profit.

Some feedstock containers provide data about the material therein in the form of a label, a bar code, an RFID transmitter, or the like. Similarly, auxiliary material information can be stored on (or wirelessly linked to) a feedstock container/collection reservoir module, to facilitate the reuse of the auxiliary material. For example, if the auxiliary material filling the collection reservoir filled were 30% ceramic paste and 70% carbon fiber-reinforced ABS, information to this effect could be stored in an online database linking it to the serial number of the feedstock container module. When the filament container is sent for recycling, the recycler could process the auxiliary material in a way that is selected to separate these two specific materials.

In other embodiments, a collection reservoir could be integrated or co-located with other AM system components, including, but not limited to, an air filtration unit, a consumable material storage unit/tray, a finished part hopper, a post processing unit (e.g., vapor smoothing unit, support material removal unit, sand blasting unit, etc.), a disposable printing platform, a print head, a raw material hopper, or a coolant filter.

Figure 9:
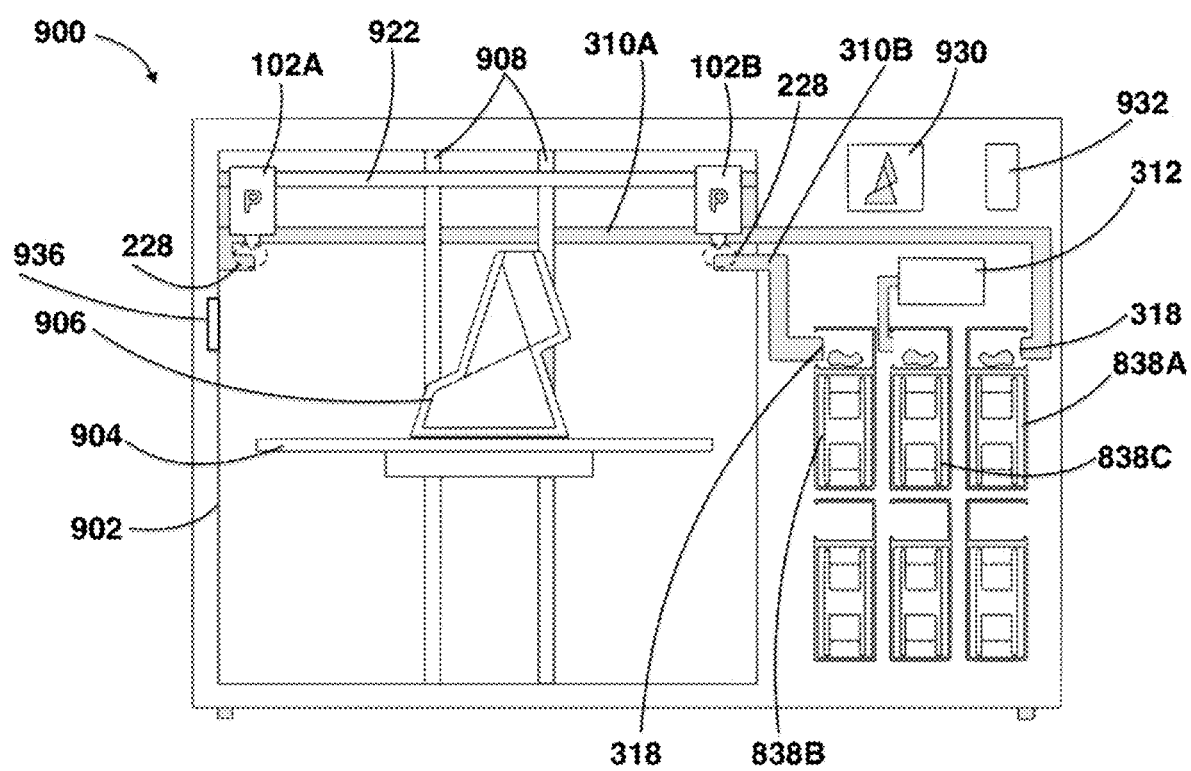
FIG. 9 shows an example fused filament fabrication (FFF) 3D printing system in cross-section. The system comprises multiple print heads and multiple AMHU's. Six feedstock container modules are shown, each feedstock container module comprising a respective collection reservoir.

An example embodiment of an AM system with a plurality of AMHU's will now be described. FIG. 9 shows an example FFF 3D printing system 900 in cross-section. If desired, the system 900 can fabricate a part(s) with six different materials. The system has two print heads 102A, 102B and casing 902 around a print volume. The print volume contains build platform 904, which is shown with a partially fabricated product 906 on it. Left print head 102A is shown positioned near entry port 228 of first material displacer 310A. Exit port 318 of the material displacer 310A is shown positioned to empty into a collection reservoir that is part of feedstock container module 838A. Right print head 102B is shown positioned near entry port 228 of material displacer 310B. Exit port 318 of the material displacer 310B is shown positioned to empty into a collection reservoir that is part of feedstock container module 838B. The print heads 102A, 102B share linear rail 922 in a print head set-up commonly referred to as an independent dual extruder system. The build platform travels along linear rails 908.

In addition to feedstock container modules 838A, 838B, four other feedstock container modules are shown in the bottom right of FIG. 9. The six feedstock containers respectively feed six materials (not shown for simplicity of the figure) to SEME apparatus 930 (see Debora et al. US 2016/0052208). The SEME apparatus 930 forms the received materials into two multicomponent feedstocks, each multicomponent feedstock comprising some desired combination of the six materials. The SEME apparatus 930 feeds the two multicomponent feedstocks (not shown for simplicity of the figure) to the print heads 102A and 102B, respectively.

Controller 932 can process printing instructions and coordinate the multiple components and systems within the AM system 900. Sensor(s) 936 can include a high precision 3-dimensional scanner, a camera, etc.

For simplicity of the figure, all components of the AMHU's are not shown. Material processing unit 312 can receive auxiliary material from a material displacer (not shown) and can include a grinder that processes the received material. The processed material is subsequently displaced to a collection reservoir in feedstock container module 838C.

In an example, the AM system 900 can print an instrumentation panel for an aircraft. A digital representation of the instrumentation panel can be sliced using a slicing software tool wherein the digital representation is converted into an executable process for the system 900 to follow in fabricating the panel. For each layer of the part, the software can identify which material(s) is/are required and coordinate the delivery of the right material(s) to each print head using the SEME apparatus. Preferably, printing is coordinated so that a print head deposits auxiliary material into an AMHU while the other print head is printing the part, so as to increase the efficiency of the system.

In this example process, at a given moment the print head 102A can be printing black nylon. As soon as it has finished, the print head 102B is to print blue nylon. After the print head 102B has finished printing blue nylon, the print head 102A is to print electrically conductive ABS to create an array of touch sensors in the instrumentation panel. For greater efficiency of this overall process, as soon as the print head 102A has finished printing the black nylon, it can immediately move to the entry port 228 of the material displacer 310A and begin transitioning material from black nylon to electrically conductive ABS and depositing auxiliary material into the material displacer 310A. At the same time, the print head 102B can begin printing the blue nylon. That is, the print head 102B can printing in parallel to the print head 102A depositing into the AMHU. Prior to this invention, it was not known for a first print head to perform a deliberate deposition of auxiliary material while a second print head is fabricating a part. This method involving parallel activities at print heads is advantageous in comparison to methods where the two activities occur in series, because overall fabrication time can be reduced.

Similarly, there are other activities at print heads that can take place in parallel in order to realize efficiencies. For example, in a process in which multiple materials with different rheology are to be printed, changes can be implemented at a first print head while a second print head is actively printing a part. For example, in the case where a first print head needs to transition from printing a material with a first melting temperature to printing a material with a second melting temperature, the temperature of the first print head can be adjusted while it is idle after having printed the first material and a second print head is printing. Having had its temperature adjusted, the first print head can begin printing the second material as soon as the second print head has finished printing. In general, printing would not need to be paused to wait for a change at a first print head to occur, which changes can sometimes take substantial amounts of time. Other examples of activities that can take place at an idle print head while another print head is printing include, but are not limited to, nozzle cleaning, material purging, nozzle changes, print head calibration, etc.

Referring again to FIG. 9 and the example of printing an instrumentation panel, the sensor(s) 936 can monitor the printed part during fabrication and compare it to the expected geometry, i.e., that of its digital representation. This closed loop verification system could provide live quality control of the printed product, i.e., quality control concomitant with printing. If at any point during printing the part failed to meet acceptable specifications, the print could be automatically canceled, the part could be removed from the build volume, and the print could be restarted. In some embodiments, a failed part can be passed into the material processing unit 312 either manually by an user, or in an automated way using a robotic actuator (not shown). In some embodiments, the material processing unit 312 can be accessible from outside of the printing system so that any desired recyclable material (such as break-away support structures) could be loaded into it and processed, then collected with other auxiliary material.

In general, it is to be understood that the motion of the print head, build platform, or any other part of an AM system can be used to activate and/or power one or more parts of an AMHU. It was noted above that, in some embodiments, a material displacer can have a motor or solenoid to help displace material from the entry port to the exit port. Alternatively, in some embodiments, an external force outside of an AMHU can cause certain components of the AMHU to function. For example, the motion of a print head of an AM system could push a lever arm extending from an AMHU such that the motion of the lever arm caused the belts of a material displacer having a conveyer belt mechanism to move. The lever arm could be connected via a ratcheting mechanism such that the repetitive motion of the print head pushing the lever back and forth could power the AMHU. In general, this type of set-up could simplify integration of an AMHU with an AM system, and/or eliminate need for an AMHU to have an electrical system.

It will be understood that this description is made with reference to certain embodiments of the invention. However, it is possible to make other embodiments that employ the principles of the invention and that fall within the spirit and scope as defined by the following claims.

What is claimed is:

1. A fused filament fabrication (FFF) system comprising:
a print head;
a collection reservoir; and
an auxiliary material handling unit (AMHU) including a material displacer having (i) at least one entry port to receive auxiliary material extruded from the print head and (ii) at least one exit port spaced apart from the at least one entry port, the material displacer configured to actively displace the auxiliary material away from the at least one entry port to the at least one exit port and into the collection reservoir.

2. The FFF system of claim 1, wherein the material displacer comprises an actuator that drives a movable element to actively displace the auxiliary material.

3. The FFF system of claim 2, wherein the movable element comprises a plunger mounted to a swinging arm.

4. The FFF system of claim 1, wherein the material displacer comprises a conveyor belt mechanism or an airflow mechanism to actively displace the auxiliary material.

5. The FFF system of claim 1, wherein the material displacer comprises an auger screw to actively displace the auxiliary material.

6. The FFF system of claim 1, further comprising a lever arm extending from the AMHU so that motion of the print head pushes the lever arm to power the material displacer of the AMHU.

7. The FFF system of claim 1, wherein the AMHU further includes a material processing unit configured to process the received auxiliary material.

8. The FFF system of claim 1, wherein the collection reservoir is integrated with a feedstock container in a feedstock container module.

9. The FFF system of claim 1, wherein the print head comprises first and second print heads wherein the FFF system is configured to coordinate printing by the first and second print heads so that, while one of the first and second print heads is depositing material to fabricate a part, the other of the first and second print heads is depositing auxiliary material away from the part.

10. The FFF system of claim 9, wherein the AMHU comprises first and second AMHUs, the first AMHU configured to receive material extruded from the first print head and the second AMHU configured to receive material extruded from the second print head.

11. The FFF system of claim 10, wherein the collection reservoir comprises first and second collection reservoirs, the first AMHU being configured to actively displace the auxiliary material extruded from the first print head into the first collection reservoir and the second AMHU being configured to actively displace the auxiliary material extruded from the second print head into the second collection reservoir.

12. The FFF system of claim 9, further comprising an active print head cleaning device that actively cleans auxiliary material from the first and/or second print head and feeds the auxiliary material into the AMHU.

13. The FFF system of claim 9, further comprising at least one sensor that senses at least one property of (i) the FFF system, (ii) the AMHU, and/or (iii) the auxiliary material passing into the AMHU.

14. The FFF system of claim 13, further comprising a controller that controls operation of the FFF system or the AMHU based on feedback from the at least one sensor.

15. The FFF system of claim 14, wherein the feedback relates to available capacity of the collection reservoir.

16. The FFF system of claim 1, wherein the AMHU comprises two or more AMHUs.

17. The FFF system of claim 1, further comprising at least one sensor that senses at least one property of (i) the FFF system, (ii) the AMHU, and/or (iii) the auxiliary material passing into the AMHU.

18. The FFF system of claim 17, further comprising a controller that controls operation of the FFF system or the AMHU based on feedback from the at least one sensor.

19. The FFF system of claim 18, wherein the feedback relates to available capacity of the collection reservoir.

20. The FFF system of claim 1, further comprising an active print head cleaning device that actively cleans auxiliary material from the print head and feeds the auxiliary material into the AMHU.

* * * * *